Patented Dec. 25, 1951

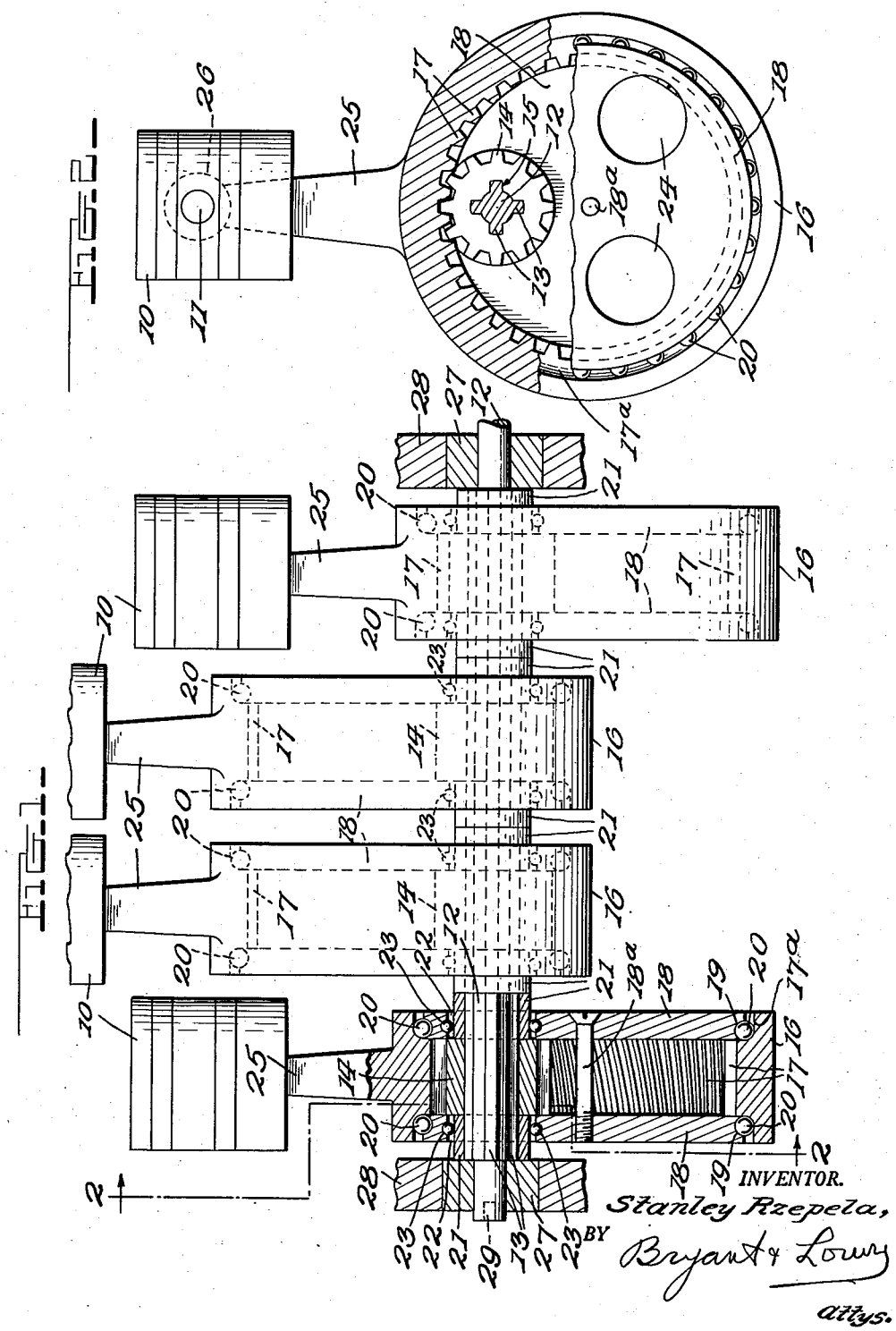

2,579,969

UNITED STATES PATENT OFFICE 2,579,969

SHAFT DRIVE FOR INTERNAL-COMBUSTION ENGINES AND THE LIKE

Stanley Rzepela, Philadelphia, Pa.

Application November 9, 1948, Serial No. 59,104

3 Claims. (Cl. 74—52)

This invention relates to internal combustion engines and has special reference to a drive for the shaft of such engines.

One important object of the invention is to provide a novel gear drive for the drive shaft of an internal combustion engine.

Another important object of the invention is to provide a novel form of gear drive for the drive shaft of an internal combustion engine wherein said gear drive constitutes an eccentric type of connection between each engine piston and the drive shaft of the engine.

A further object of the invention is to provide such an eccentric type connection embodying an internally toothed device as part of an eccentric type strap.

With the above and other objects in view, as will be presently apparent, the invention consists in general of certain novel arrangements of details and combinations of parts hereinafter fully described, illustrated in the accompannying drawings and particularly claimed.

In the accompanying drawings like characters indicate like parts in the several views, and:

Fig. 1 is a side elevation, partly in section, showing a portion of an internal combustion engine embodying this invention, and Fig. 2 is a section on the line 2—2 of Fig. 1.

In the invention as here disclosed the main shaft drive is shown as applied to a four cylinder engine but it is to be understood that such invention may be applied to an engine having any number of cylinders desired, the cylinders themselves being omitted from the drawings.

In each of the cylinders of such an engine there is provided the usual piston 10 open at the bottom and having a wrist pin 11 extending transversely of the hollow portion of the piston. Through the engine extends a drive shaft 12 having ribs 13 extending therealong and forming splines.

Fitted on the shaft 12 below each piston 10 is an externally toothed gear 14 having a central opening 15 conforming in shape to the cross section of the spline provided on shaft 12, so that rotation of the gear 14 will cause rotation of the shaft 12. A circular hollow member 16 surrounds each gear 14 and is provided internally with a band of teeth 17 spaced centrally between the open sides of the member 16. The teeth 17 mesh with the teeth of the gear 14, and the teeth of the gear 14 and member 16 are spirally disposed for smooth running.

Each of the open sides of the member 16 is provided with an internal rabbet 17a forming a ball race. Seated in each open side of the member 16 is a plate 18 having a peripheral ball race 19 and balls 20 are held between these two races. These plates are held in place by a bolt 18a. Collars 21 are mounted on the shaft 12 at the opposite sides of the gear 14 and these collars lie in openings 22 formed in the plates 18. The collars 21 are of less diameter than the openings 22 so as to allow space for bearing balls 23. The collars 21 are of such diameter and the openings 22 are so positioned that proper meshing relation is maintained between the gear teeth on the gear 14 and member 16. Other openings 24 may be provided in the plates 18 at different distances from the centers of said plates. Since the centers of the openings 22 and 24 determine the axial position of the gear 14 a proper spacing of said openings from the periphery of a plate 18 permits gears 14 having different numbers of teeth to be used, this enabling the gear ratio to be varied. Projecting radially from the member 16 is an arm 25 having on its end an eye 26 through which the pin 11 passes.

The shaft 12 is journalled in bearings 27 forming bushings in an engine frame shown in part at 28 and in one end of the shaft is formed a socket 29 for the usual starting crank (not shown).

In operation from the position shown the shaft 12 is started in rotation by means of the starting crank. The gear 14 rotates with the shaft and acts to swing the member 16 so that its center is out of alinement with a line passing through the centers of the pin 11 and shaft 12. At the same time (considering the piston at the left of Fig. 1) the piston 10 starts to move upwardly under the influence of the gear engagement. When the piston has reached the upper limit of its stroke the member 16, through inertia of movement, will swing past dead center and the piston 10 will act to carry the member 16 downwardly to rotate the gear 14 and thus actuate the shaft 12.

As above pointed out and illustrated in the drawings, the invention pertains more particularly to internal combustion engine assemblages, parts, such as the cylinders, timing controls, etc., being omitted as they are of the usual type, the drawings pertaining more particularly to the variations from the usual type of such assemblies.

As shown, the assembly operates on the well known four cycle characteristic, the four pistons shown in Fig. 1 each having the four stroke regimen of intake, compression, combustion and scavenging succession, following the usual regimen practice. For instance, the showing of Fig. 2 presents the position of the two outer pistons of Fig. 1, this showing the dead center position at the end of the intake or the combustion stroke, one of such end pistons presenting the end of the intake stroke while the other end piston presents the end of the combustion stroke. The two intermediate pistons of Fig. 1 present the dead center positions at the end of either of the compression or the scavenging strokes, respectively.

One fundamental distinction, however, is present here over the general structure of this type, viz.: in the general type the drive shaft is formed with crank zones for the respective pistons—the shaft being known as the crank shaft; in the present invention the drive shaft is free from said crank zones, the shaft having a constant axis continuous from end to end, the several pinions 14 which are mounted on the drive shaft having their axes alined with each other and with the drive shaft axis. Each pinion cooperates with the internally toothed ring member 16 with which it is associated and which forms an element for the piston unit, each ring member having a constant tooth engagement with its pinion, such engagement being maintained through the presence of the pair of plates 18 carried at opposite sides of the ring member and eccentrically mounted on the drive shaft. Since each of the pair of plates is eccentrically mounted relative to the axis of its opening axially alined with the axis of the drive shaft, the plates will planet about such axis, and since such plates are also concentric within the ring members 16, said members must have their movements relative to the plate peripheries, thus maintaining the teeth of complemental ring members and pinions in constant tooth engagement.

In practice, two successive rotations of the piston unit about the axis of the drive shaft present the regimen for the four-cycle operation of the piston unit, the four successive strokes of the regimen each presenting a half revolution of the unit, the usual timing assemblies—not shown—being employed in the assemblage to produce the regular succession of strokes in proper timing relation between units, as with the crank shaft type of units.

In fabricating the assembly, with the plates 18 loosened, the members 16 of the two end units may be swung to the Fig. 2 positions, and the pistons lowered into engagement with the respective pinions; these activities will properly position the plates of these two units in proper alinement with the members 16 of the unit, permitting the plates to be moved into their housed positions and secured in anchored relation by bolts 18ª. The plates of the two inner units may then be given similar treatment, as by raising the pistons until the lower toothed zone of the ring members of the inner units engage the lower teeth of the respective pinions, whereupon the plates 18 are returned to position for anchoring; an alternative way would be to first position the end piston units, and then move the assembly through one stroke, thus raising the outer end units and lowering the inner units to the position of Fig. 2 to thereafter complete the assembly.

Considering a unit in service, and assuming the shaft is traveling clockwise in Fig. 2, advance of the shaft causes member 16 to shift to the right in Fig. 2, thus changing the angularity of element 25, the internal teeth of the ring members advancing from the left and raising the piston through the 180° travel of the up-stroke, the two intermediate pistons traveling through the downward stroke instead of upwardly, the internally toothed faces of the members moving about the pinions. The assembly is cranked by hand or otherwise until the normal working regimen has been developed, after which the assembly continues operation similar to assemblies of the usual type.

When the assembly is to be operated under different speed ratio conditions, the pinions 14 are removed, loosening plates 18 to permit substitution and re-anchoring. The Fig. 2 form presents an intermediate ratio as in service, opening 24 at the left providing for a larger pinion while opening 24 at the right presents a smaller pinion than that of Fig. 2; the former tends to decrease the length of the stroke, while the latter tends to increase the stroke length above that shown by Fig. 2.

Although the invention has been described as relating to internal combustion engines, it is to be understood that it could well be employed in connection with air compressors and the like, and while there is herein shown and described the preferred form thereof, modifications and changes may be resorted to, such as will fall within the scope of the subject matter claimed.

I claim:

1. In internal combustion engines of the four-cycle type, wherein the several pistons are subjected to stroke regimens in normal succession for rotating the drive shaft of the engine, and in combination, a piston and cylinder assemblage, a drive shaft common to the several pistons, said shaft being free from crank formations, and means for operatively connecting the several pistons individually with the drive shaft to rotate the latter by the application of the regimens of the several pistons individually in predetermined succession on such shaft, said means comprising an annular member individual to and pivotally supported by each piston, said member being toothed internally to present the member as an internally toothed gear, and a pinion for and individual to each of said annular ring members with the pinions keyed to the drive shaft, said annular gear member and its pinion being relatively mounted for tooth engagement as a piston unit, the pinions of the respective piston units being alined axially with one another and with the drive shaft axis, each piston unit providing its four-cycle regimen strokes in similar order with the timing of similar regimen strokes of the assembly of units individually differing as between neighbor units, each annular gear member including demounting means individual to the member for enabling adjustment of the angular timing relation of a piston unit relative to its neighbor and for maintaining toothed engagement of ring member and pinion of the individual piston unit during service.

2. An assemblage as in claim 1 characterized in that the demounting means for a piston unit comprises a pair of circular plate closures mounted on the ring member in spaced axial relation on opposite sides of the unit pinion, with each plate carrying at least one circular opening for the passage of the drive shaft, said opening being positioned in the plate eccentric to the axis of the plate, each plate having an outer peripheral bearing relation to the adjacent inner face of the ring member and also having a bearing relation between the wall of said opening and a sleeve carried by the drive axle to thereby limit service movements of the plates of the piston unit to pivotal movements relative to the drive shaft axis and concurrently maintain toothed engagement between the pinion and the toothed zone of the ring member.

3. An assemblage as in claim 2 characterized in that each of the plates of the piston unit is equipped with a plurality of separate circular openings in spaced-apart relation about the face of the plate, each opening having its axis spaced a different distance radially from the plate axis, the opposite plate of the pair having its openings in matched relation to those of the first plate to locate the respective opening axes as axially alined with respect to the direction of length of the drive shaft to thereby permit either matched opening of the pair of plates to be positioned in drive shaft relation to the drive shaft for cooperation therewith of a pinion of either of a selected gear ratio group with resultant selective variation in the length of each piston stroke.

STANLEY RZEPELA.

REFERENCES CITED

The following references are of record in the file of this patent:

UNITED STATES PATENTS

| Number | Name | Date |
| --- | --- | --- |
| 1,728,279 | Ramsey | Sept. 17, 1929 |
| 1,863,667 | Miranda | June 21, 1932 |
| 1,867,981 | Mudd | July 19, 1932 |
| 2,460,428 | O'Leary | Feb. 1, 1949 |

FOREIGN PATENTS

| Number | Country | Date |
| --- | --- | --- |
| 594,954 | Great Britain | Nov. 24, 1947 |